United States Patent [19]

Grzesiak

[11] Patent Number: 4,757,880
[45] Date of Patent: Jul. 19, 1988

[54] STRAP CONFIGURATION FOR A REVERSE DOUBLE WRAP BAND

[75] Inventor: Anthony J. Grzesiak, Sauk Village, Ill.

[73] Assignee: Borg-Warner Automotive, Inc., Troy, Mich.

[21] Appl. No.: 800,246

[22] Filed: Nov. 21, 1985

[51] Int. Cl.[4] .................... F16D 51/00; F16D 69/00
[52] U.S. Cl. ................... 188/77 W; 188/259
[58] Field of Search ............ 188/77 W, 77 R, 250 B, 188/250 E, 250 F, 250 G, 250 H, 259, 204 A, 249; 192/107 T, 109 B

[56] References Cited

U.S. PATENT DOCUMENTS

| 1,526,121 | 2/1925 | Crowley | 188/77 W |
| 1,580,270 | 4/1926 | Williams | 188/77 W X |
| 1,950,260 | 3/1934 | Nelson | 188/244 |
| 2,328,817 | 9/1943 | Tourneau | 188/77 W |
| 2,704,882 | 3/1955 | Olson | 29/418 X |
| 2,841,864 | 7/1958 | Kelly | 29/418 |
| 2,867,898 | 1/1959 | Vosler et al. | 29/416 |
| 3,367,466 | 2/1968 | Lang | 188/259 X |
| 3,386,535 | 6/1968 | Bishop et al. | 188/77 R |
| 3,483,955 | 12/1969 | Schell et al. | 192/107 T X |

FOREIGN PATENT DOCUMENTS

| 607710 | 7/1926 | France | 188/77 W |
| 618500 | 2/1949 | United Kingdom | 188/77 R |
| 1348352 | 3/1974 | United Kingdom | 188/77 R |
| 2108014 | 5/1983 | United Kingdom | 188/77 W |
| 480872 | 10/1975 | U.S.S.R. | 188/249 |

Primary Examiner—Andres Kashnikow
Assistant Examiner—Robert J. Oberleitner
Attorney, Agent, or Firm—James A. Geppert

[57] ABSTRACT

An improved reverse double wrap brake band for the automatic transmission of an automotive vehicle wherein the band is lightweight and heat set round at the released position and utilizes a thinner strap material at higher hardness ranges. The configuration of the double wrap band has a wider central band segment adjacent the anchor portion of the bracket assembly, with the band width tapering over 60 to 70 percent of its length toward the apply end of the band; thus providing a double wrap band of increased durability for the friction lining and increased apply end, drum, and fatigue life.

7 Claims, 2 Drawing Sheets

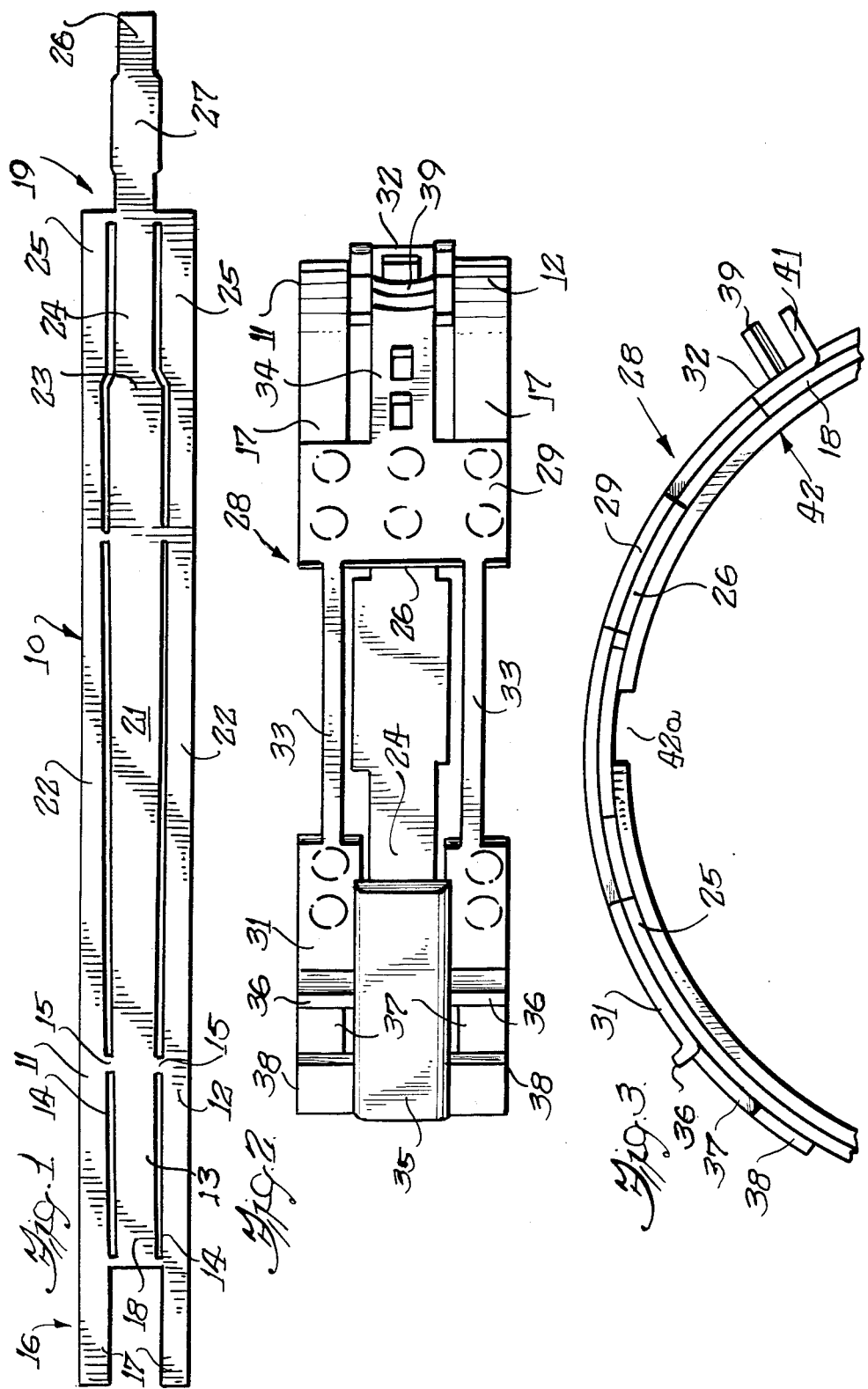

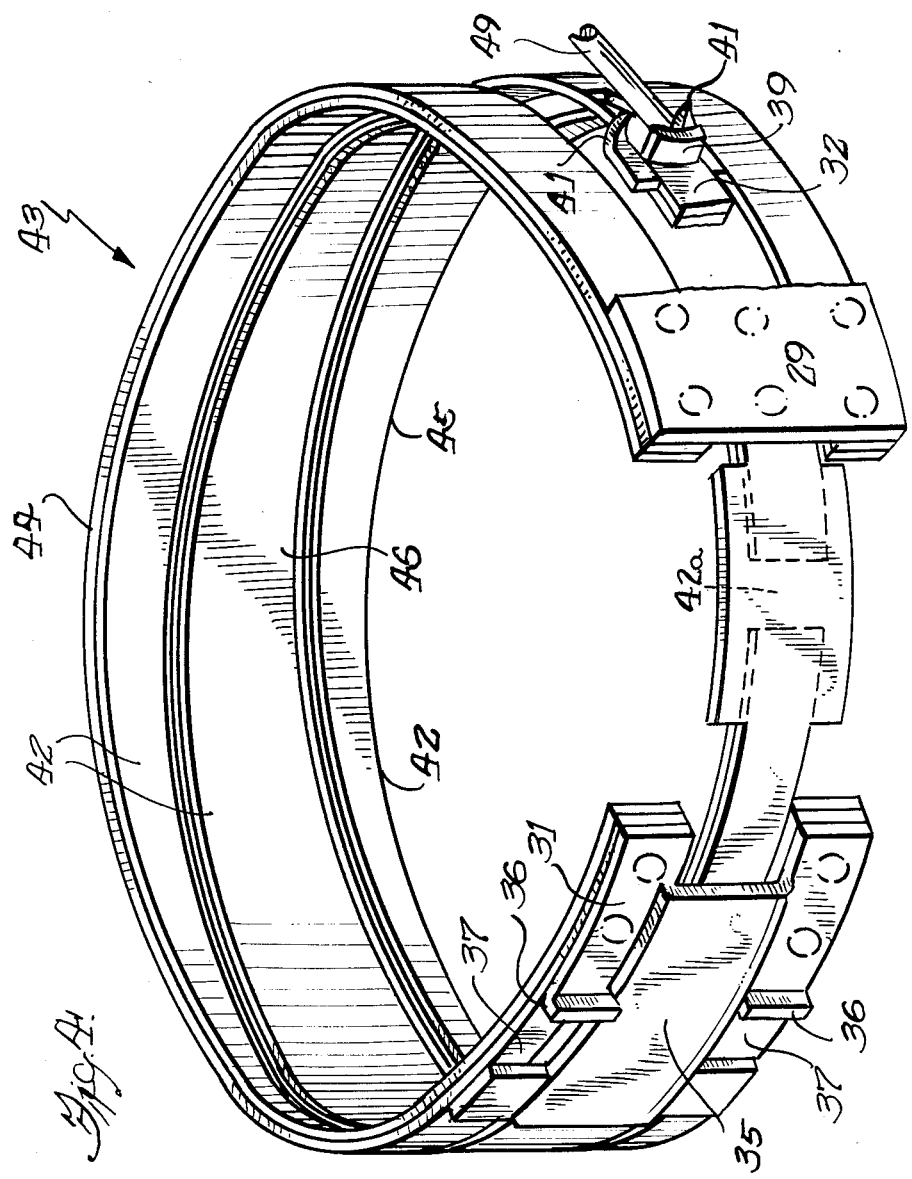

STRAP CONFIGURATION FOR A REVERSE DOUBLE WRAP BAND

BACKGROUND OF THE INVENTION

Conventional automatic transmissions transmit torque through what is commonly called a planetary gear system, where the planetary gears are in constant mesh and thus cannot clash. They also provide, through arrest of the various gear carrying members, means for drive ratio and direction selection. Brake bands under suitably hydraulic controls are sometimes used to effect these changes. The bands provide a means of holding gear carriers and usually act as apply force multipliers. As the governing equation is exponential in nature, a so-called double wrap band may have more than twice the holding power of an otherwise similar single wrap band, at the expense of increased stroke to full applied position.

Conventionally manufactured double wrap brake bands are formed from a relatively thick metal strap, and a metal forging or casting is butt-welded to the ends of the strap to provide apply and anchor bracket portions and a transverse bar portion for the band; the anchor and apply portions or ears being engaged by the struts and a hydraulic piston in the transmission, respectively, to actuate the band. Once the bracket is secured to the strap, the band and bracket may be heat treated and expanded to size, the bracket is transversely broached or milled to form the transverse bar portion and apply and anchor ears, openings are pierced through the bottom wall of the slots, the interior surface of the band is prepared for bonding and a friction lining applied thereto, openings are pierced through the lining, the interior surface is bored and the lining is grooved, and two circumferential slots are cut through the lining strap and bracket except for the transverse bar portion to result in three generally parallel radially expansible bands.

In copending U.S. patent application Ser. No. 310,340, an improved double wrap band and its method of formation is disclosed which obviates the disadvantages of the internal stresses created in previous bands formed by the above process that lead to distortion of the bands so they are out of round in the released position, thus creating undesirable friction drag between the band and clutch drum and uneven engagement of the band on the drum when actuated. The band of the above application utilizes a stamped preslotted thin steel band with transverse tie portions and a stamped bracket with longitudinal tie portions secured thereto. A preslotted friction lining is applied to the interior of the band and bracket, and the tie portions are punched out to form the three parallel band portions having improved roundness in the released position. This type of construction allows anchor configurations and spacings not possible in conventional construction bands.

SUMMARY OF THE INVENTION

The present invention relates to an improved double wrap brake band which is assembled from a preformed and preslotted stamped strap, a preslotted friction liner and a separate stamped one-piece bracket member; the band and bracket being secured together and the liner applied to the interior surface thereof. The band configuration provides a preslotted stamped strap having substantially equal width outer bands at one end and a widening central band with narrowing outer bands towards the opposite end, the narrow end of the central band forming with the bracket the apply end which terminates short of the ends of the outer bands secured to the transverse bar portion, and the widened end of the central band extending beyond the outer bands and terminating in a reduced end portion secured to the transverse bar portion of the bracket. The central band tapers from the wider end to the opposite narrower end portion over a range of 60 to 70 percent of the entire strap length. The bracket is appropriately sized for the width of the band ends.

Further objects are to provide a construction of maximum simplicity, efficiency, economy, and ease of assembly, and such further objects, advantages and capabilities as will later more fully appear and are inherently possessed thereby.

DESCRIPTION OF THE DRAWINGS

FIG. 1 is an elevational view of the preslotted sstrap utilized in the formation of the improved band.

FIG. 2 is an elevational view of the band and bracket before removal of the connecting ties.

FIG. 3 is a partial edge elevational view of the band and bracket.

FIG. 4 is an enlarged perspective view of the completed double wrap brake band.

DESCRIPTION OF THE PREFERRED EMBODIMENT

Referring more particularly to the disclosure in the drawings wherein is shown an illustrative embodiment of the present invention, FIG. 1 discloses a preslotted stamped strap 10, utilized in the formation of the reverse double wrap brake band, composed of outer bands 11 and 12 and a central band 13 separated by generally longitudinally extending slots 14,14 interrupted by transverse ties 15,15. The strap includes at the left end 16 of FIG. 1 a pair of substantially equal width outer band ends 17,17 extending beyond a slightly wider end 18 of the central band 13. From a point spaced from the end 18, the slots 14,14 diverge toward the opposite end 19 of the strap to provide a widening central band portion 21 and tapering outer band portions 22,22 until, at a point short of end 19, the central band abruptly tapers inwardly at 23 to provide a portion 24 of a width substantially equal to the width of end 18 and outer band end portions 25,25 of widths equal to that of ends 17,17. The central band end 26 extends beyond the ends 25 with an optional widened intermediate portion 27.

A suitable stamped one-piece anchor bracket 28 (FIG. 2) is utilized to join the opposite ends 16 and 19 of the strap 10 to form a circular brake band. The brackt includes a transverse bar portion 29 of a width equal to the strap width, an anchor portion 31 of equal width with the bar portion and spaced therefrom by longitudinally extending ties 33, and a centrally located apply portion 32 being joined to the bar portion 29 by a longitudinally extending tie 34. The transverse bar portion 29 overlaps the ends 17,17 of the outer bands and end 26 of the central band and is suitably secured thereto, as by spot welding and/or brazing.

The anchor portion 31 is secuted to the ends 25,25 of the outer bands and has a raised bridging portion 35 receiving thereunder the central band portion 24 adjacent the tapered portion 23 and extending to the end 26 secured to the transverse bar portion; the bridging portion allowing for limited movement of the central band 13 when the double wrap band is applied to engage the clutch drum or released therefrom. Also, the anchor portion is provided with upwardly bent transverse ears 36,36 adjacent notches 37,37 extending inward from the opposite edges 38 of the anchor portion and generally aligned with the outer bands. Also, the apply portion 32 is secured to the opposite end 18 of the central band and has an upwardly bent ear or lip 39 adapted to cooperate with piston 49C (see FIG. 4) in the transmission to tighten the band onto the clutch drum. A pair of upwardly bent circumferentially extending locating ears 41,41 are positioned on opposite sides of ear 39.

The one-piece anchor bracket member 28 is formed into an arcuate member of substantially the same curvature as the curved strap 10 and secured to the overlapped ends thereof as above noted. The assembled unit is heat treated, formed and heat set to the desired diameter over an expanding fixture. A preslotted friction lining 42 having longitudinally extending slots and transverse ties with complementary tapered bands is bonded to the interior surface of the formed band by a suitable adhesive. Because of manufacturing considerations, the lining material must have a gap 42a in some portion of the band. By placing this gap in section 27 (FIG. 4), its effects on function are minimized. The ties 33,34 joining the bracket portions are removed by punching, and then the ties 15 joining the bands of the strap are removed by punching or other suitable operation to form the interconnected three bands 44,45,46 of the final assembly 43 (FIG. 4). The extent of taper of the central band in the preslotted stamped strap is in the range of 60 to 70 percent of the total length of the strap and is tailored to the application. As well as having better alignment of the band and superior roundness for more uniform engagement and lower open running drag, the tapered portion of the central band provides increased lining durability by allowing a more uniform lining pressure distribution, increased apply end fatigue life through reduction of band end flexure, and reduced brake drum distortion through better heat and radial load distribution. Also, the stamping of the preslotted band and the anchor bracket allows use of materials that when suitably processed, result in a higher strength to weight ratio and hence improved fatigue life over equal weight conventional double wrap bands. Also, use of a stamped bracket allows configurations not possible with conventional band ends. This type of construction is capable of being held to closer tolerances than conventional construction. Restating the above, at equal strength levels, this type of construction results in improved engaged conformity, lighter weight and a smaller required envelope.

I claim:

1. A double wrap brake band adapted to be engaged by an actuating piston, comprising a pair of substantially parallel circumferentially extending curved outer bands terminating in first and second adjacent ends and a circumferentially extending curved central band within and substantially parallel to the outer bands and terminating in first and second adjacent ends, and a sheet metal bracket member joining the bands to form a substantially circular double wrap band, said bracket member including a transverse connecting bar portion joined to the first end of each band, the outer bands extending in one direction from the bar portion and the central band extending in the opposite direction therefrom, an anchor portion joined to the second ends of said outer bands and having a raised central bridging portion to allow the central band to pass thereunder, and an apply portion joined to the second end of said central band, said anchor portion having a pair of locating surfaces aligned with the outer bands and said apply portion having an engaging surface receiving the actuating piston, the improvement comprising that the central band is tapered over 60 to 70 percent of its length to provide a widened portion adjacent said anchor portion of the bracket member and a narrower end for said apply portion.

2. A double wrap brake band as claimed in claim 1, in which said anchor portion locating surfaces include a pair of transversely spaced upturned ears adjacent a pair of inwardly extending notches in the outer edges of the anchor portion.

3. A double wrap band as set forth in claim 1, wherein said outer bands parallelling said central band have corresponding tapered portions resulting in narrowed band portions adjacent the widened portion of said central band.

4. A double wrap brake band as set forth in claim 3, wherein the first and second ends of the outer bands are substantially equal in width.

5. A double wrap brake band as set forth in claim 4, wherein said widened portion of the central band is located adjacent said bracket anchor portion and terminates in a projecting end having a width substantially equal to the narrower end thereof.

6. A double wrap brake band as set forth in claim 5, including a friction lining applied to the interior surface of and corresponding in configuration to said outer and central bands.

7. A double wrap brake band as set forth in claim 1, wherein the engaging surface of said apply portion includes an upturned ear flanked by a pair of offset upturned locating tabs.

* * * * *